(12) United States Patent
Zhao

(10) Patent No.: US 8,624,536 B2
(45) Date of Patent: Jan. 7, 2014

(54) SYSTEM AND METHOD FOR DETECTING A HIGH CURRENT CONDITION IN A MOTOR

(75) Inventor: Zhongrui "Kevin" Zhao, Shanghai (CN)

(73) Assignee: STMicroelectronics R&D (Shanghai) Co., Ltd., Shanghai (CN)

( * ) Notice: Subject to any disclaimer, the term of this patent is extended or adjusted under 35 U.S.C. 154(b) by 421 days.

(21) Appl. No.: 12/892,500

(22) Filed: Sep. 28, 2010

(65) Prior Publication Data
US 2011/0074328 A1    Mar. 31, 2011

(30) Foreign Application Priority Data
Sep. 29, 2009   (CN) .......................... 2009 1 0175701

(51) Int. Cl.
*H02H 7/085* (2006.01)
*H02K 11/00* (2006.01)

(52) U.S. Cl.
CPC .................................. *H02K 11/001* (2013.01)
USPC ........................... 318/490; 318/499; 318/280

(58) Field of Classification Search
CPC ..................................................... H02K 11/001

USPC .......................... 318/490, 499, 439, 280, 138
See application file for complete search history.

(56) References Cited

U.S. PATENT DOCUMENTS

| | | | | | |
|---|---|---|---|---|---|
| 4,057,743 | A | * | 11/1977 | Limberg | 327/595 |
| 4,276,504 | A | * | 6/1981 | Nagase et al. | 318/721 |
| 4,851,743 | A | * | 7/1989 | Schmerda et al. | 388/811 |
| 5,373,436 | A | * | 12/1994 | Yamaguchi et al. | 363/98 |
| 5,874,818 | A | * | 2/1999 | Schuurman | 318/400.04 |
| 6,046,556 | A | * | 4/2000 | Cargille | 318/400.04 |
| 6,066,834 | A | * | 5/2000 | Rebold | 219/137.71 |
| 6,710,564 | B2 | * | 3/2004 | Shibuya et al. | 318/400.22 |
| 7,852,038 | B2 | * | 12/2010 | Ramu | 318/701 |

* cited by examiner

*Primary Examiner* — Bentsu Ro
*Assistant Examiner* — David Luo
(74) *Attorney, Agent, or Firm* — Slater & Matsil, L.L.P.

(57) ABSTRACT

In one embodiment, a system for controlling a motor is disclosed. The system has a driver circuit configured to drive a motor, a current sensing impedance coupled to the driver circuit, and an overload detection circuit coupled to the current sending impedance that has a transistor and a detection output node.

18 Claims, 3 Drawing Sheets

SYSTEM AND METHOD FOR DETECTING A HIGH CURRENT CONDITION IN A MOTOR

CROSS-REFERENCE TO RELATED APPLICATIONS

This application claims the priority benefit of People's Republic of China Patent Application No. 200910175701.8, filed on Sep. 29, 2009, and entitled "System and Method for Detecting a High Current Condition in a Motor," which is hereby incorporated by reference to the maximum extent allowable by law.

TECHNICAL FIELD

This invention relates generally to electronic circuits, and more particularly to a system and method for sensing a high current condition in a motor.

BACKGROUND

Motors have been used for a wide variety of consumer and industrial applications such as transportation, manufacturing and home appliances. While motors have been in existence for many years, more sophisticated methods of motor control have been employed as motor technology has advanced. In particular, variable speed induction motors and permanent magnet brushless DC motors have become more prevalent. Such systems typically require solid-state driver devices, motor position sensors and microprocessor based motor controllers.

In a typical three-phase variable speed induction motor, time varying currents are supplied to three stator windings to create a rotating magnetic field. This time varying magnetic field induces the rotor containing a permanent magnet to turn. The speed of the motor is determined, in part, by the frequency of the time varying current controlled by a motor control unit.

In applications where a motor is exposed to a variable load, for example in an electric bicycle or a kitchen appliance, the current required by the stator windings are proportional to the physical load being driven. In cases where a motor is prevented from turning, for example, in an accident or under an extremely heavy load, or in cases where the motor experiences a short circuit, current drivers within the motor controller may experience a high degree of electrical stress and sink high currents. If the currents provided by the motor controller are too high, the motor controller can rapidly become damaged. High motor currents also lead to high power consumption, poor motor efficiency, frequent motor breakdowns.

Some prior art systems that have addressed the problem of motor high currents under high loads by limiting the current to the motor via a closed current control loop. A problem with relying on closed-loop control to limit motor current is that the closed-loop response time may be too slow to avoid damage to the motor and motor controller. Other prior art systems employ complicated current sensors that add cost and complexity to the motor control system.

In the field of motors, what is needed are fast and cost efficient systems and methods of detecting high current conditions within a motor.

SUMMARY

In one embodiment, a system for controlling a motor is disclosed. The system has a driver circuit configured to drive a motor, a current sensing impedance coupled to the driver circuit, and an overload detection circuit coupled to the current sending impedance that has a transistor and a detection output node.

In another embodiment, a circuit for sensing an overload condition in a driver is disclosed. The circuit has a sensing impedance configured to be coupled to a driver and an overload detector. The overload detector includes a transistor that has a control node coupled to the sensing impedance, an output node coupled to an overload signal, and a reference node coupled to a reference voltage.

In a further embodiment, a method for sending an overload condition in a motor is disclosed. The method includes monitoring a voltage across a shunt resistor coupled to a return path of a driver coupled to the motor. Monitoring includes sensing a node of the shunt resistor with a control node of a transistor, turning on the transistor if a voltage at the node of the shunt resistor exceeds a threshold, and activating an overload signal if the transistor is turned on.

The foregoing has outlined, rather broadly, features of the present disclosure. Additional features of the disclosure will be described, hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in different figures generally refer to corresponding parts unless otherwise indicated. The figures are drawn to clearly illustrate the relevant aspects of embodiments of the present disclosure and are not necessarily drawn to scale. To more clearly illustrate certain embodiments, a letter indicating variations of the same structure, material, or process step may follow a figure number.

DETAILED DESCRIPTION OF ILLUSTRATIVE EMBODIMENTS

The making and using of embodiments are discussed in detail below. It should be appreciated, however, that the present invention provides many applicable inventive concepts that may be embodied in a wide variety of specific contexts. The specific embodiments discussed are merely illustrative of specific ways to make and use the invention, and do not limit the scope of the invention.

The present invention will be described with respect to embodiments in a specific context, namely a system and method for detecting a high current condition in a motor. Embodiments of this invention may also be applied to other circuits and systems that require detection of high currents resulting from short circuits and other high current conditions.

Figure 1:
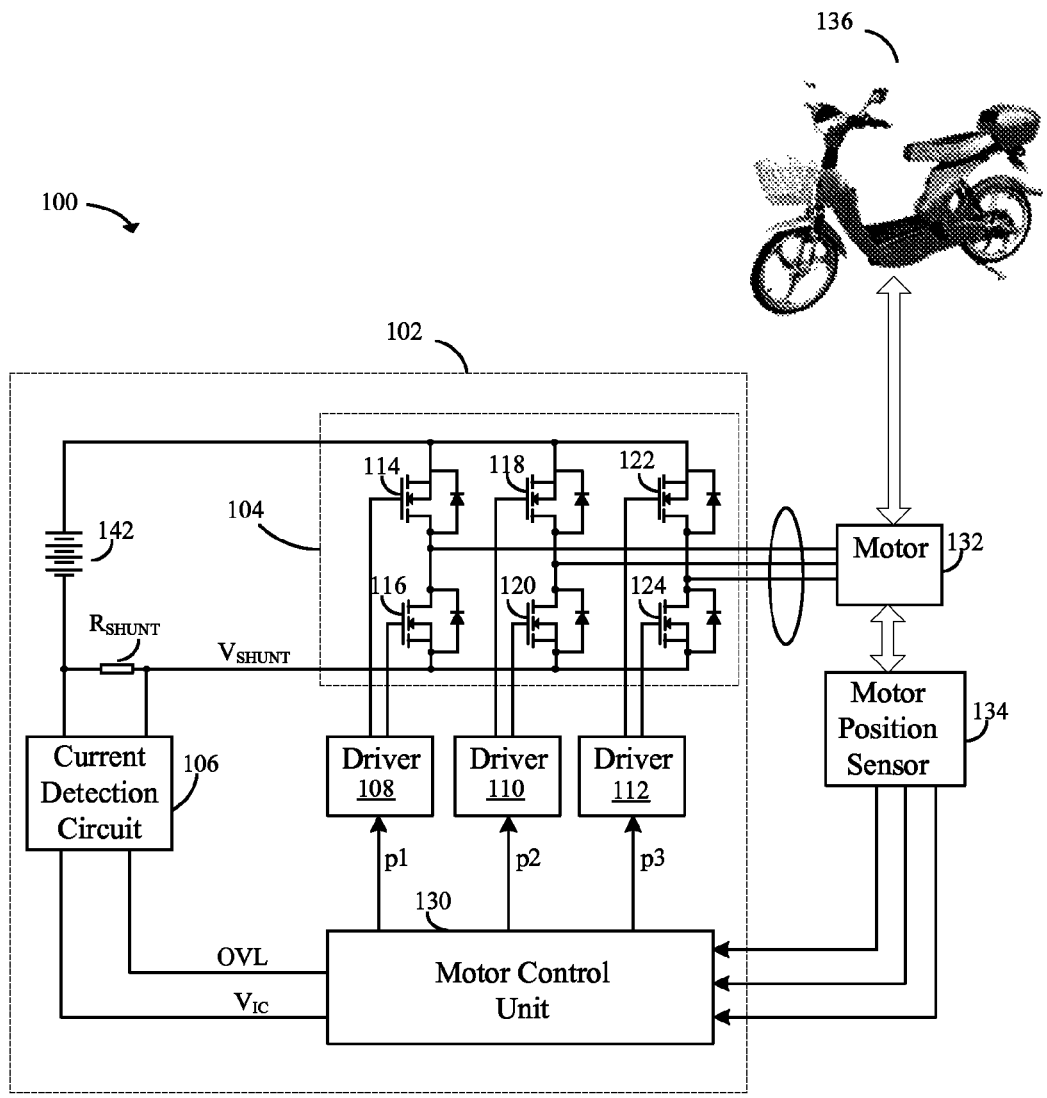
FIG. 1 illustrates a schematic of an embodiment motor system.

FIG. 1 illustrates drive system 100 for electric bicycle 136 according to an embodiment of the present invention. Drive system 100 has motor control system 102 coupled to motor 132 and motor position sensor 134. In an embodiment, motor 132 is a three phase permanent magnet brushless DC motor. In alternative embodiments, motor 132 can be of a different architecture from a three phase induction motor, for example, a single phase DC motor or stepper motor. Motor position sensor 134 is coupled to motor 132 and utilizes motor sensing techniques known in the art such as a Hall effect sensor or a back EMF (BEMF) signal to sense the motor position and/or velocity. The output of motor position sensor 134 is coupled to Motor Control Unit (MCU) 130, and is used as feedback signals for closed-loop control of the motor. In an embodiment, motor control system 102 is implemented with components on a printed circuit board (PCB). In alternative embodiments, some, or all of the components in MCU 130 are implemented on an integrated circuit.

MCU 130 provides driver control signals p1, p2 and p3 according to conventional techniques such as using pulse width modulated (PWM) drive signals. Drivers 108, 110 and 112 buffer driver control signals p1, p2 and p3 to provide drive signals to three phase MOSFET drivers 104. Drivers 108, 110 and 112 are referenced to a 15V supply voltage, however, other driver supply voltages can be used in alternative embodiments. Three-phase MOSFET drivers 104 have NMOS devices 116, 120, 124, 114, 118 and 122, which are configured as three inverters. Each NMOS device preferably integrates a source-drain diode. In alternative embodiments, the diode can be omitted and/or other transistor types can be used for some or all of the driver transistors, for example PMOS, JFET or BJT devices. The drain nodes of half side MOSFET drivers 104 are coupled to the stator input of motor 132. In alternative embodiments of the present invention, other driver device types can be used, for example, a driver for permanent magnet synchronous motor (PMSM), an induction motor, etc.

Three-phase MOSFET drivers 104 are further coupled to power supply 142. In an embodiment, power supply is a 36 or 48 VDC battery. In alternative embodiments, other power supplies, such as switched mode power supplies, or wall power converters can be used. Other power supply voltage levels besides 36 or 48 VDC can be used as well depending on the particular application and its requirements.

Return current though MOSFET drivers 104 is measured across shunt resistor $R_{SHUNT}$ coupled to the ground terminal of MOSFET drivers 104. Resistor $R_{SHUNT}$ is preferably about 2 mΩ, although other values can be used in alternative embodiments. Voltage $V_{SHUNT}$ across $R_{SHUNT}$ is monitored by current detection circuit 106, which provides integrated current signal $V_{IC}$ and overload detect signal OVL. Current signal $V_{IC}$ is preferably proportional to the integral of $V_{SHUNT}$ in order to reduce steady state error in the motor control loop. In alternative embodiments, current signal $V_{IC}$ can be a proportional to $V_{SHUNT}$, or be omitted. Signal $V_{IC}$ is monitored by an analog-to-digital (A/D) converter in MCU 130 in embodiments where MCU 130 is implemented digitally. Alternatively, the A/D converter can be external to MCU 130. In embodiments where MCU 130 is implemented as an analog motor controller, an A/D converter may not be necessary.

Overload detect signal OVL becomes active when Current Detection Circuit 106 detects a high current condition. Signal OVL is preferably an active low digital TTL or CMOS signal referenced to a 5V, however, in alternative embodiments, OVL can be active high and operate according to other digital signaling standards with reference to other supply voltages. When current detection signal OVL becomes activated, MCU 130 deactivates motor 132 by turning off NMOS devices 114, 116, 118, 120, 122 and 124 within MOSFET drivers 104 to prevent damage to MOSFET drivers 104 and motor 132.

Figure 2:
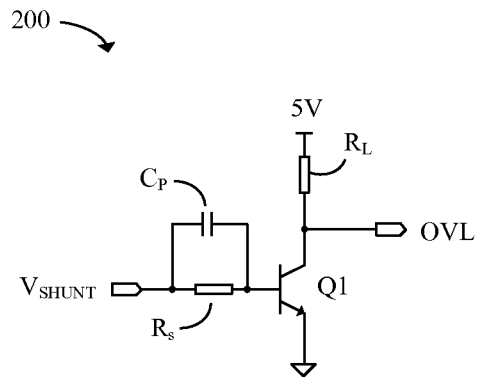
FIG. 2 illustrates an embodiment current detection circuit.

FIG. 2 illustrates a schematic of embodiment current detection circuit 200. Current detection circuit 200 has transistor Q1 coupled to $V_{SHUNT}$, which is the voltage across current detection resistor $R_{SHUNT}$ (FIG. 1). Q1 is coupled to $V_{SHUNT}$ via series resistor $R_S$ in parallel with capacitor $C_P$. Resistor $R_L$ is a pulldown resistor coupled to the collector of transistor Q1. In an embodiment, Resistor $R_S$ is preferably about 2KΩ, capacitor $C_P$ is preferably about 1000 pF, and $R_L$ is preferably about 20 KΩ. Q1 is preferably a 2N5551 bipolar junction transistor (BJT), however, other transistor types and technologies can be used in alternative embodiments, for example MOSFETs, JFETs, etc. Alternatively, other values for $R_S$, $R_L$ and $C_P$ can be used. Furthermore, $R_S$ and $C_P$ can be omitted and $R_L$ can be replaced with an alternative load, such as a current source, depending on the application and its requirements. Resistor $R_S$ buffers the base of transistor Q1 from current detection resistor $R_{SHUNT}$. $C_P$ provides a feedforward AC path to the base of transistor Q1 to provide a faster response time.

During operation of the current detection circuit 200 when input $V_{SHUNT}$ is less than about 0.7V, Q1 conducts very little or no collector-emitter current, therefore the voltage of output OVL is at the 5V power supply voltage. In alternative embodiments of the present invention, OVL can be referenced to other supply voltages. When the base-emitter voltage of Q1 is sufficient to turn-on Q1, for example, about 0.7V, current at the collector of Q1 draws current though resistor $R_L$ and signal OVL is pulled low, thereby signifying a high current condition in three phase inverter 104 (FIG. 1).

Figure 3:
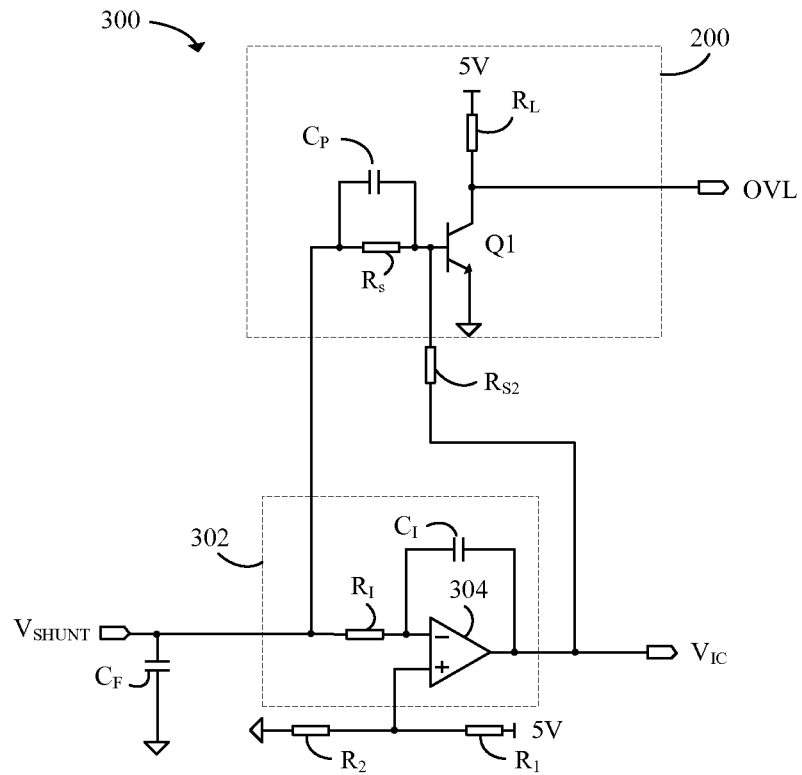
FIG. 3 illustrates another embodiment current detection circuit.

FIG. 3 illustrates another embodiment of current detection circuit 300 that includes current detection circuit 200 of FIG. 2, as well as integration circuit 302. Integration circuit 302 has OPAMP 304, integration capacitor $C_I$ coupled between the output of OPAMP 304 and the negative input of OPAMP 304, and resistor $R_I$ coupled between input voltage $V_{SHUNT}$ and the negative input of OPAMP 304. The positive input of OPAMP 304 is biased with a voltage divider made of resistors $R_1$ and $R_2$. The output of OPAMP 304 forms integrated current output $V_{IC}$, which is coupled to the base of Q1 via series resistor $R_{S2}$. In an embodiment of the present invention, $R_I$ is about 500Ω, R1 is about 10 KΩ, R2 is about 60 KΩ, $R_{S2}$ is about 50 KΩ, and $C_I$ is about 10,000 pF. $C_F$, which is used to filter the input of the current detect circuit, is about 0.1 µF. The OPAMP is preferably an LM358 amplifier, however, in alternative embodiments of the present invention, other component values and amplifier types can be used. By coupling integrated current output $V_{IC}$ to the base of Q1, noise is filtered in order to avoid extraneous triggering of the OVL signal.

In the embodiments illustrated FIG. 3, current detection circuit 300 operates at a power supply voltage of about 5V. In alternative embodiments, other power supply voltages can be used.

During closed-loop operation of the motor controller, integration circuit 302 is used to detect the return current of MOSFET drivers 104 (FIG. 1). Assuming no OPAMP input current, the voltage at the positive input $U_+$ and negative input $U_-$ of OPAMP 304 is:

$$U_+ = U_- = 5v*60k/(60k+10k) = 4.2v.$$

Output voltage $V_{IC}$ of integrator circuit 302 is, therefore:

$$V_{IC} = 4.2 - \frac{1}{C_I}\int_0^t \frac{4.2 - V_{SHUNT}}{R_I} dt.$$

When current to the motor is increasing, in some cases due to an increased load on the motor, the current across shunt resistor $R_{SHUNT}$ will increase, thereby causing a corresponding increase in $V_{SHUNT}$. Because the output voltage and inverting input of OPAMP 304 have a reverse relationship, voltage $V_{IC}$ will decrease with a corresponding increase of $V_{SHUNT}$ (if $V_{SHUNT}$ is greater than 4.2 V). Output $V_{IC}$, therefore, can be used to indicate a current value. In embodiments where the motor is under closed loop control, voltage $V_{IC}$ will provide a direct indication of the motor load current.

In an embodiment, signal $V_{IC}$ is monitored by an A/D converter in MCU 130 (FIG. 1), which determines a voltage change ratio in a period of time and derives a current slope value. Under heavy load conditions or when the output of MOSFET drivers 104 are shorted, voltage $V_{SHUNT}$ will increase dramatically and will, in turn, turn on transistor Q1, which will induce a low voltage level at overload detect signal OVL. In an embodiment, the OVL is coupled to an emergency stop port of MCU 130 (FIG. 1). When overload detect signal OVL is detected to be low by MCU 130, MCU 130 immediately shuts off all PWM signals to drivers 108, 110 and 112 (FIG. 1).

Figure 4:
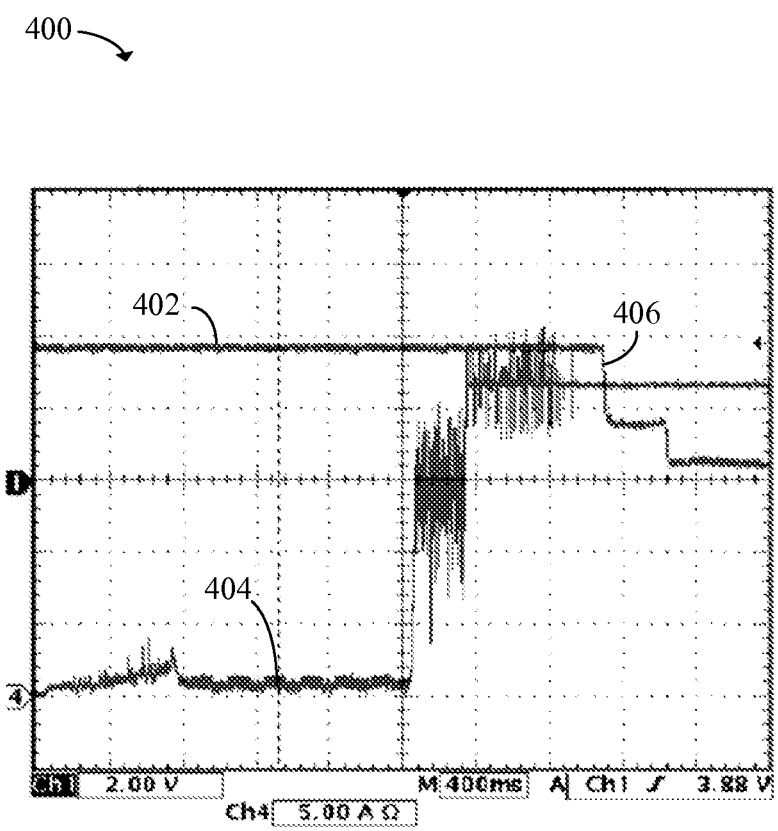
FIG. 4 illustrates a waveform diagram showing the current detection performance of an embodiment motor system.

Turning to FIG. 4, waveform diagram 400 illustrates the operation of current detection circuit 300. Trace 404 represents the load current being supplied to the motor and trace 402 represents output $V_{IC}$ of OPAMP 304. It can be seen that trace 402 decreases in response to the increasing current represented by trace 402. The decrease in output voltage $V_{IC}$ of OPAMP 304 occurs, as shown at section 406 of trace 404.

It should be further appreciated that in further embodiments, the motor controller, drivers, current detection circuit, and/or other blocks can be implemented in other ways besides using a PCB. For example an integrated circuit can be used. Furthermore, in alternative embodiments, other applications besides electric bicycles can be used, for example, household appliances and industrial motor applications.

It will also be readily understood by those skilled in the art that materials and methods may be varied while remaining within the scope of the present invention. It is also appreciated that the present invention provides many applicable inventive concepts other than the specific contexts used to illustrate embodiments. Accordingly, the appended claims are intended to include within their scope such processes, machines, manufacture, compositions of matter, means, methods, or steps.

What is claimed is:

1. A system for controlling a motor, the system comprising:
a driver circuit configured to drive the motor;
a current sensing impedance coupled to the driver circuit;
an overload detection circuit coupled to the current sensing impedance, the overload detection circuit comprising a transistor and a detection output node, wherein the transistor comprises:
a control terminal coupled to the current sensing impedance,
an output terminal coupled to the detection output node; and
a reference terminal coupled to a reference node, wherein the control terminal, output terminal and reference terminal are separate terminals, and wherein the control terminal controls a current between the output terminal and the reference terminal; and
an integration circuit coupled between the current sensing impedance and the overload detection circuit.

2. The system of claim 1, wherein the transistor comprises a single bipolar junction transistor (BJT), wherein the control terminal comprises a base of the BJT, the output terminal comprises a collector of the BJT and the reference terminal comprises an emitter of the BJT.

3. The system of claim 2, wherein the overload detection circuit further comprises a first resistor coupled between the current sensing impedance and the base of the BJT.

4. The system of claim 1, further comprising:
a first resistor coupled between the current sensing impedance and the control terminal of the transistor; and
a second resistor coupled between the integration circuit and the control terminal of the transistor.

5. The system of claim 1, further comprising a controller unit coupled to the driver circuit and the detection output node, the controller unit comprising a motor position input for sensing a position of a motor.

6. The system of claim 5, wherein the motor further comprises a current sensing input coupled to an output of the integration circuit.

7. The system of claim 6, wherein the driver circuit comprises three drivers for driving a three phase motor.

8. The system of claim 6, further comprising the motor.

9. The system of claim 1, wherein the sensing impedance comprises a resistor.

10. A circuit for sensing an overload condition in a driver, the circuit comprising:
a sensing impedance configured to be coupled to a driver;
an integration circuit coupled to the sensing impedance; and
an overload detector comprising a transistor, the transistor comprising
a control terminal coupled to the sensing impedance,
an output terminal coupled to an overload signal, and
a reference terminal coupled to a reference voltage, wherein the control terminal controls a current between the output terminal and the reference terminal.

11. The circuit of claim 10, wherein:
the transistor comprises a bipolar junction transistor (BJT);
the control terminal comprises a base of the BJT;
the output terminal comprises a collector of the BJT; and
the reference terminal comprises an emitter of the BJT.

12. The circuit of claim 11, wherein the BJT comprises an NPN transistor.

13. The circuit of claim 10, wherein the integration circuit comprises:
an opamp; and
a capacitor coupled between an output of the opamp and an inverting input of the opamp.

14. The circuit of claim 10, further comprising:
a first resistor coupled between the sensing impedance and the control terminal of the transistor; and
a second resistor coupled between an output of the integration circuit and the control terminal of the transistor.

15. A method for sensing an overload condition in a motor, the method comprising:
monitoring a voltage across a shunt resistor coupled to a return path of a driver coupled to the motor, monitoring comprising
sensing a node of the shunt resistor with a control terminal of a transistor, wherein the control terminal controls a current between an output terminal of the transistor and a reference terminal of the transistor, turning on the transistor if a voltage at the node of the shunt resistor exceeds a threshold, and activating an overload signal coupled to the output terminal of the transistor if the transistor is turned on.

16. The method of claim 15, further comprising:

detecting the overload signal; and turning off the driver based on the detecting.

17. The method of claim 16, wherein:

detecting the overload signal is performed with a microcontroller configured to control the motor.

18. The method of claim 15, wherein:

the transistor comprises a bipolar junction transistor (BJT);

the control terminal comprises a base of the BJT; and the output terminal comprises a collector of the BJT.

\* \* \* \* \*